(No Model.)

F. F. BILHOEFER.
EYEGLASSES.

No. 549,991. Patented Nov. 19, 1895.

Witnesses
Jos. S. Latimer
David H. Mead

Inventor
Frederick F. Bilhoefer
by Arthur B. Browne
his Attorney

UNITED STATES PATENT OFFICE.

FREDERICK F. BILHOEFER, OF BUFFALO, NEW YORK.

EYEGLASSES.

SPECIFICATION forming part of Letters Patent No. 549,991, dated November 19, 1895.

Application filed November 23, 1894. Serial No. 529,759. (No model.)

*To all whom it may concern:*

Be it known that I, FREDERICK F. BILHOEFER, of Buffalo, in the county of Erie and State of New York, have invented certain new and useful Improvements in Eyeglasses, of which the following is a specification.

The present improvements consist in making the entire nose-bridge and clamp of eyeglasses, including the means for attaching the same to the glasses and for maintaining the glasses in proper position relatively to the bridge and clamp, of a single piece of metal. Particularly the improvements are intended for use with lenses not having rims.

The improvements are illustrated in the accompanying drawings, wherein—

Figure 1:
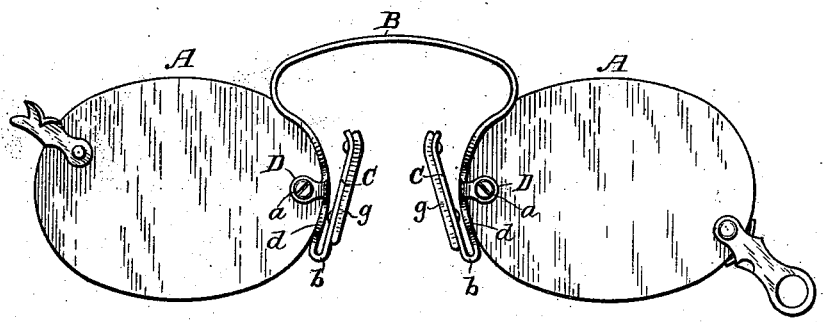
Figure 2:
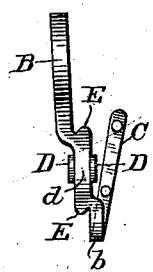
Figure 3:
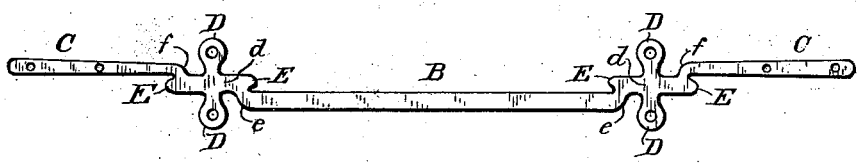

Figure 1 is a front view of a pair of eyeglasses provided with the improvements. Fig. 2 is a side view of the same, the lenses being removed. Fig. 3 is a plan view of the sheet-metal blank from which the nose bridge and clamp are formed.

Referring to Fig. 1, A A are the lenses; B, the nose bridge or spring; C C, the nose-clamps, which seat upon the nose; D D, the clasps or ears, which embrace the lenses on opposite sides thereof and by which the attaching screws or rivets *a a*, passing through the lenses, are supported, and E E are shoulders against which the lenses seat for the purpose of being properly positioned.

The nose-clamps C C join the nose-bridge B at the lower ends *b b* of its depending limbs *d d*, and extend thence, when in use, backwardly for the purpose of throwing the horizontal portion of the nose-bridge forward away from the forehead of the wearer, as shown in Fig. 2, and they extend toward each other, so as to have the proper clamping action upon the nose. The resilience of the bends *b b* gives elasticity to the clamps C C, irrespective of the nose-bridge B, so that the clamps can by their own elasticity accommodate themselves to the nose, thus saving the bridge from strain.

The bridge B, clamps C C, clasps D D, and shoulders E E are all formed from a single sheet-metal blank such as is shown in Fig. 3, so that they are made all in one piece. The sheet-metal blank is stamped or otherwise cut out in a single piece, and this blank is bent to form the nose bridge and clamp. As shown in Fig. 3, the nose-bridge B or spring proper is forward of its limbs *d d*, being united therewith by the offsets *e e*, and the clamps C C are back of the limbs *d d*, being united therewith by offsets *f f*. (It will be be noted that the words "forward" and "back," as here used, are words of direction only, and are descriptive only when the blank is regarded as placed in Fig. 3.) This arrangement facilitates the formation of the shoulders E E at the opposite ends of the limbs *d d*, and contributes to the positioning of the bridge forward of and out of contact with the forehead of the wearer when in use. The blanks as thus formed constitute in themselves articles of manufacture and of trade, since they may be and are sold to oculists and opticians in this form, who subsequently bend them into shape and fit them to the lenses. A single size of these blanks can be used for persons having very different configurations of noses, foreheads, and eyes. The clamps C C can be bent at the bends *b b* to any angle to each other and forward or back, as desired, to accommodate the lenses to differently-spaced eyes and to adapt the glasses to different-shaped noses. The only tool required is the ordinary optician's pliers. The necessity of keeping in stock a large variety of nose-clamps and different lengths of lens-posts, as is customary, is thus avoided. By thus making the nose-bridge, clamps, clasps, and shoulders of a single piece of sheet metal, all soldering or riveting of parts together is avoided, and breakage such as is common between ordinary bridges and posts is avoided.

The clamps C C may be provided with smooth or serrated shoes of leather, rubber, bone, pyroxyline, &c., in the usual manner, as shown at *g g* in Fig. 1.

The blanks may be made of any suitable metal.

While all of the merits of the present improvements are most conspicuous when applied to rimless eyeglasses, they can nevertheless be used with rimmed eyeglasses or with spectacles both rimmed and rimless.

Eyeglasses provided with the present improvements can be folded in the usual manner.

I claim as my invention—

1. The intermediate nose-bridge B, the limbs $dd$ at opposite ends of said nose-bridge, each of said limbs having projecting from its opposite sides the lens-clasps D D, and the nose-clamps C C at the other ends of said limbs, said nose-clamps extending upwardly and rearwardly from said limbs, said nose-bridge, limbs, lens-clasps, and nose-clamps being composed of, and bent out of a single piece of sheet metal, substantially as set forth.

2. The intermediate nose-bridge B, the limbs $d,d$, at opposite ends of said nose-bridge, said nose-bridge extending from the sides of said limbs, each of said limbs having the lens-clasps D D projecting from its opposite sides, and the shoulders E E projecting from their ends, and the nose-clamps C C extending from the sides of said limbs opposite to the sides from which the nose-bridge extends, said nose-clamps extending upwardly and rearwardly from said limbs, all of said parts being composed of, and bent out of a single piece of sheet metal, substantially as set forth.

3. The sheet-metal blank having central bridge-part B, limbs $d\ d$ at its opposite ends, clasp-parts D D projecting laterally from the said limbs, shoulder-parts E E projecting from the opposite ends of said limbs, and clamp-parts C C extending outwardly from the outer ends of said limbs, substantially as set forth.

4. The sheet-metal blank having central bridge-part B, limbs $d\,d$, offsets $e\,e$ connecting one side of each limb near its inner end with one end of said bridge-part B, clasp-parts D D projecting laterally from both sides of each of said limbs, shoulder-parts E E projecting from the opposite ends of each of said limbs, the outwardly-projecting clamp-parts C C, and the offsets $f\,f$ connecting one side of each limb near its outer end with one of said clamp-parts, said offsets $f\,f$ and offsets $e\,e$ being on opposite sides of the limbs, substantially as set forth.

In witness whereof I have hereunto signed my name in the presence of two subscribing witnesses.

FREDERICK F. BILHOEFER.

Witnesses:
ANDREW J. PURDY,
O. O. COTTLE.